United States Patent [19]

Knecht

[11] 4,312,377
[45] Jan. 26, 1982

[54] TUBULAR VALVE DEVICE AND METHOD OF ASSEMBLY

[75] Inventor: Helmut Knecht, Clark, N.J.

[73] Assignee: Teledyne Adams, a Division of Teledyne Isotopes, Inc., Union, N.J.

[21] Appl. No.: 70,690

[22] Filed: Aug. 29, 1979

[51] Int. Cl.³ .......................................... F16K 11/085
[52] U.S. Cl. ........................ 137/625.19; 137/625.47; 251/317; 251/345
[58] Field of Search ..................... 137/625.42, 625.46, 137/625.15, 625.16, 625.21, 625.22, 597, 375, 597, 625.19, 625.47; 251/344, 345, 346, 314, 316, 317

[56] References Cited

U.S. PATENT DOCUMENTS

| | | | |
|---|---|---|---|
| 594,954 | 12/1897 | Jendis | 137/625.42 |
| 679,533 | 7/1901 | Moore | 137/625.47 |
| 1,178,769 | 4/1916 | Whidden | 137/625.47 |
| 1,708,224 | 4/1929 | Harris | 251/345 |
| 1,893,896 | 1/1933 | Heftler | 137/625.47 |
| 2,811,422 | 10/1957 | Hopper | 251/345 |
| 3,033,226 | 5/1962 | Allen | 251/344 |
| 3,090,396 | 5/1963 | Rudelick | 251/314 |
| 3,368,583 | 2/1968 | Weaver | 137/625.46 |
| 3,554,488 | 1/1971 | Alexander | 251/317 |
| 3,561,487 | 2/1971 | Reed, Jr. | 251/345 |
| 4,204,465 | 5/1980 | Knecht | 99/293 |

FOREIGN PATENT DOCUMENTS 1316 of 1891 United Kingdom ............ 137/625.19

Primary Examiner—A. Michael Chambers
Attorney, Agent, or Firm—Weingram & Klauber

[57] ABSTRACT

A tubular valve for controlling the flow of fluids includes an outer tubular shell having pairs of ports on diametrically opposed surfaces and an inner coaxial transfer tube having pairs of openings which are selectively rotated into or out of alignment with the outer tubular ports. Deformable grommets enclose and seal the space between the outer shell and inner tube and provide lateral tubular extensions projecting through the outer ports for connection to external sources and apparatus. The inner transfer tube, which is rotatable within the grommets, provides communication for fluid flow between inlet and outlet ports and openings. Different fluids may be selectively controlled and supplied through separate outlets.

During assembly, each deformable grommet is folded around an insertion device which is inserted into the outer tubular shell and twisted to release the tubular extension which projects laterally from the port. After insertion of the several grommets, the inner transfer tube is pushed through the outer shell and concentric grommets until the openings in the transfer tube are aligned with the outer shell ports. Plugs are inserted into opposite open ends of the inner tube to provide a closed sealed unit. A rotatable control knob secured at one end of the inner tube selectively positions the openings and ports to supply fluids through the tubular extensions.

7 Claims, 6 Drawing Figures

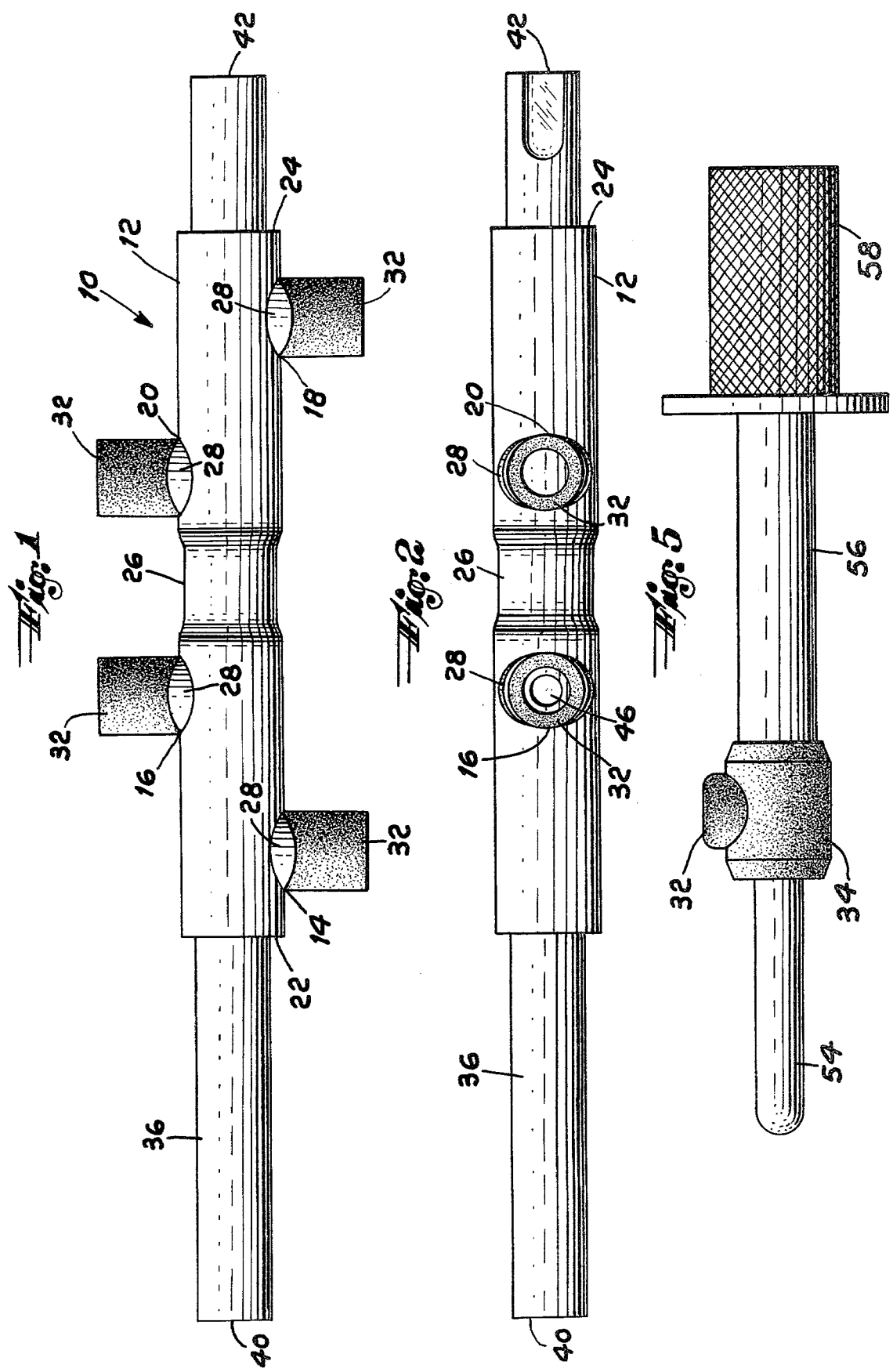

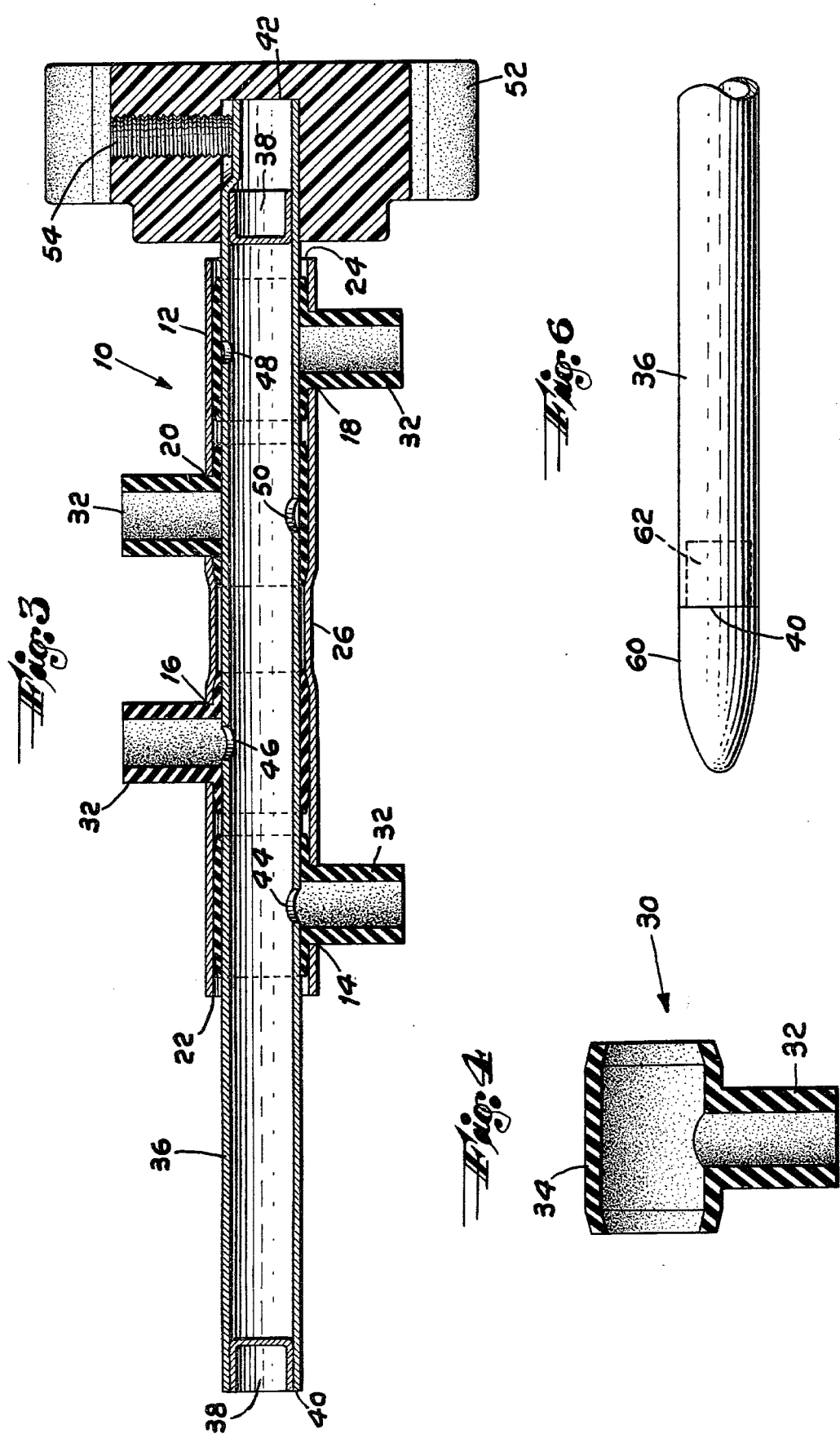

TUBULAR VALVE DEVICE AND METHOD OF ASSEMBLY

BACKGROUND OF THE INVENTION

1. Field of the Invention

This invention relates to a tubular valve and method of assembly and more particularly, to a valve having a concentric arrangement of inner and outer tubes with inlet and outlet ports and openings which are selectively aligned to control the flow of fluids therethrough.

2. Description of the Prior Art

Many devices for controlling the flow of fluids require complex valving mechanisms which are difficult to use and expensive to manufacture. Where it is desired to select and control different fluids, it is usually necessary to utilize separate conduits which are joined at the valve. The valve is generally of a type requiring contacting elements which open and close passages and are subject to wear.

A unique type of tubular valve is described in related co-pending U.S. patent application Ser. No. 961,612, filed Nov. 17, 1978 now U.S. Pat. No. 4,204,465 issued May 27, 1980 and assigned to the same assignee as the instant application. This valve is used in a particular steam, hot water and coffee dispensing apparatus for selective delivery of the fluids from a heated container. The valve, however, is not limited to the use described in the co-pending application and is described herein as an independent device of more general use.

SUMMARY OF THE INVENTION

To overcome the problems set forth above, the present invention provides a tubular valve structure having an outer tubular shell with ports on opposite surfaces and an inner coaxial tube having openings that are rotated into and out of alignment with the ports. Deformable T-shaped grommets seal the space between the shell and tube and have tubular extensions projecting laterally through the outer ports for connection to external sources and apparatus. Fluid communication between inner tube and outer shell is provided by rotation of the inner tube within the grommets in succession to selectively align particular openings and ports. Assembly of the elements is achieved by first folding the grommets around an insertion tool which is repeatedly inserted into the outer shell and turned to allow each grommet extension to project from a respective port. The inner tube is then inserted through the outer shell and grommets to align the inner openings with the outer ports. The ends of the inner tube are plugged to seal the unit except for the selected inlets and outlets.

Accordingly, it is an object of the present invention to provide a novel tubular valve having a simplified structure which is inexpensive to manufacture and is less subject to wear.

It is another object of the present invention to provide a novel tubular valve which provides separation between two different fluids and permits simple selection and delivery of either fluid.

It is a further object of the present invention to provide a novel tubular valve wherein a concentric arrangement of inner and outer tubes have inlet and outlet openings and ports that are selectively rotated into alignment to control the flow of fluids therethrough.

It is yet another object of the present invention to provide a novel method of assembly of a tubular valve having deformable grommets which are inserted into an outer shell to project through ports in the shell and an inner tube inserted into the shell through the grommets to align inner openings with the outer ports.

These and other objects and advantages will become apparent from the following description taken in conjunction with the accompanying drawings.

BRIEF DESCRIPTION OF THE DRAWINGS

FIG. 1 is a side elevation of the tubular valve assembly of the present invention showing the tubular grommet extensions projecting through the outer shell ports.

FIG. 2 is a plan view of the assembly showing the tubular extensions through a pair of the upper ports.

FIG. 3 is a side cross-sectional view of the tubular valve assembly showing the rotatable inner tube and openings in one selected position wherein one pair of openings is aligned with one pair of outer shell ports.

FIG. 4 is a side cross-sectional view of one T-shaped deformable grommet.

FIG. 5 is a side view of a typical insertion tool utilized for inserting the deformable grommets into the outer shell.

FIG. 6 is a side view of a typical insertion device utilized in conjunction with the inner transfer tube for insertion into the outer shell through the assembled grommets.

DESCRIPTION OF THE PREFERRED EMBODIMENTS

As shown in FIGS. 1, 2 and 3, a tubular valve, indicated generally at 10, includes an outer stationary tubular shell 12, preferably of a thin strong corrosion resistant metal. The outer shell includes two pairs of diametrically opposed ports 14, 16, 18, 20 spaced at predetermined lengths from the ends 22, 24. Ports 14, 18 are positioned closer to respective ends 22, 24, while ports 16, 20 are closer to the center 26. Pairs 14, 16 and 18, 20 are symmetrical with respect to the center 26 and are of equal dimensions. The holes have oblong or elliptical shapes with raised sides or lips 28 along opposite edges. These are formed by piercing and extruding the metal using a die punch. The raised lips serve as stress relievers for deformable T-shaped grommets 30 projecting through the ports, as will be described in greater detail hereinafter. The center area 26 of the outer shell may have a necked down or narrow diameter section, as indicated, which may serve to locate the position of the adjacent grommets. This can be formed by expansion of the tubular shell extending toward the opposite ends or by rolling in the center section. The shell may also be straight and of uniform diameter without the necked center.

As shown in FIG. 4, hollow T-shaped deformable grommets or bushings 30 are positioned at each port, with a lateral tubular extension 32 including a small passage projecting outwardly through each port in the outer shell. Extensions 32 serve as stems for connecting to external sources of fluid and utilization devices. The main hollow cylindrical section 34 having a larger longitudinal passage, fits closely within and is concentric with the outer shell at each port. The projecting stem through the port also prevents rotation of the grommet during operation of the valve. The grommet is preferably of a resilient deformable material such as silicone rubber and serves as a seal between the inner transfer tube 36 and outer shell in the areas around the ports and openings.

Inner rotatable transfer tube 36 fits closely within and is concentric with the tubular grommets and extends coaxially through the outer shell 12. Tube 36 is hollow and has metal cup-shaped plugs 38 enclosing the opposite ends 40,42 extending beyond the ends of the outer shell. Four openings 44, 46, 48, 50 are spaced along opposing surfaces of tube 36 so that pair 44, 46 may be aligned with ports 14, 16 respectively, and pair 48, 50 may be aligned with ports 18, 20 by selective rotation of tube 36. The inner tube openings are smaller in diameter than the outer ports. When pair 44, 46 are aligned with ports 14, 16 at opposing surfaces, as shown in FIG. 3, pairs 48, 50 are 180° out of alignment with ports 18, 20. When pairs 48, 50 are aligned with ports 18, 20, the other pair 44, 46 is 180° out of alignment with ports 14, 16. With the inner tube rotated into an intermediate 90° position in either direction, all of the ports and openings are out of alignment and the valve is in a fully closed position.

The spaces between the inner tube and outer shell around the aligned openings and ports are sealed by the T-shaped grommets. Fluids are therefore directed into and out of the inner transfer tube through tubular extensions 32 projecting from the outer shell when the valve is set in the open position for the selected pairs of openings and ports, as on the left side of FIG. 3. Openings 48, 50, however, on the right side, are positioned at the surfaces opposite ports 18, 20 and are thus closed and sealed by the main tubular sections 34 of the grommets.

A control knob 52, secured to one end 42 of the inner tube by means of a set screw 54, selectively rotates the inner tube within the outer shell. The knob preferably has three positions: an OFF position, wherein the inner tube is at 90° in either direction with respect to the outer shell, so that all openings are closed and 90° out of alignment with the ports; a first selected ON (1) position, wherein openings 44, 46 are aligned or in register with ports 14, 16 to direct a selected fluid through the left side of the valve, as shown in FIG. 3, while openings 48, 50 are closed and 180° out of alignment with ports 18,20; and a second selected ON (2) position, wherein openings 48, 50 are open and aligned with ports 18,20 to direct a fluid through the right side of the valve, while openings 44, 46 are 180° out of alignment with ports 14, 16 and are closed. The outer shell 12 is generally secured to an external utilization device so that it is held stationary while the inner tube 36 is rotated therein by knob 52.

In order to assemble the valve elements, a special tool or fixture may be employed such as shown in FIG. 5. The first step is to slide the main tubular section 34 of the grommet over a longitudinal probe or rod 54 until it seats against the larger diameter shaft 56. The tubular extension or stem 32 is then folded down around section 34 and rod 54 to permit insertion into the open end 24 of outer shell 12. Handle 58 is used to push the rod and grommet along the shell until the extension 32 reaches the desired port 20, for example. This distance is fixed by the dimension between the center of extension 32 and the end of enlarged diameter shaft 56. The handle is then twisted and manipulated until extension 32 engages port 20 and springs outwardly to its full height. This process is repeated for each grommet until four are positioned in the four posts. Since the ports are symmetrically spaced about the center of the shell, two like tools of different lengths may be used to insert two grommets from each end of the shell.

After the grommets are in place, the inner transfer tube 36 is inserted through the main tubular passages of the grommets and concentric shell until the openings 44, 46, 48, 50 are aligned with ports 14, 16, 18, 20. This assembly operation may be facilitated by use of another tool or attachment 60, in the form of a curved conical cap, having a short round stub 62 at the opposite end, which fits into the cupped opening at end 40 of tube 36 and plug 38. The tube 36 and cap 60 are then wet, preferably with water, to lubricate the surfaces and permit the cap and tube to slide easily through the close fitting grommets, after which the cap is removed. When the inner tube, outer shell and grommets are in proper position, the knob 52 is secured at end 42 and attachments are made to the stems of the grommets to connect the valve to the external sources and devices to be supplied and controlled.

The valve may be used to control various fluids and mixtures in many different combinations and applications. In place of the three position valve as described above, the valve may be divided into two independent units by a divider which separates the openings and ports on one side from the other side. In another variation, only one rotary valve section may be employed by using only one-half the tubular length and one pair of openings and ports having one open and one closed position. While a limited number of embodiments have been illustrated and described, it is apparent that many variations may be made in the particular design and configuration without departing from the scope of the invention as set forth in the appended claims.

What is claimed is:

1. A tubular valve comprising:
   an outer shell open at both ends and having a first pair of ports on opposing surfaces,
   a first pair of deformable resilient valve sealing means having a main hollow cylindrical section with a longitudinal passage and a lateral tubular extension with a secondary passages, said main cylindrical sections fitting closely within said shell with said lateral extension projecting outwardly through respective ports, and an inner transfer tube including closing means positioned at opposite ends of said inner transfer tube to enclose and seal said ends extending coaxially through and being rotatable within said outer tubular shell and longitudinal passages of said valve sealing means, said tube including a first pair of openings on opposing surfaces, said openings being positioned for selective rotation into and out of alignment with said ports, said valve sealing means filling and sealing the space between said inner tube and outer shell in the area around said opening and ports, said tube providing communication for fluids between said pairs of ports and openings upon rotation into alignment in a first open position and preventing communication there between upon rotation out of alignment in a closed position.

2. The tubular valve of claim 1 wherein said closing means include a pair of plugs positioned at opposite ends of said tube to enclose and seal said ends.

3. The tubular valve of claim 2 including a second pair of opposing ports spaced along said outer shell from said first pair of ports, a second pair of opposing openings spaced along said inner transfer tube from said first pair of openings, a second pair of deformable resilient valve sealing means disposed in the area around said second pairs of ports and openings and sealing the space between said inner tube and outer shell and having lateral extensions projecting from said second pair of ports, said tube being rotatable into a second open position for alignment of said second pairs of openings and ports, while said first pairs of opening and ports are out of alignment in a closed position.

4. The tubular valve of claim 3 including a selector knob secured at one end of said inner transfer tube for selectively rotating said tube and openings into said open and closed positions.

5. The tubular valve of claim 4 wherein said lateral tubular extensions of said valve sealing means are adapted for connection to external fluid sources and utilization devices, said selector knob selectively supplying fluid from said sources to said devices.

6. The tubular valve of claim 5 wherein each of said ports include raised lips extending laterally around the edges of said ports for providing stress relief for said tubular extensions of said valve sealing means projecting through said ports.

7. The tubular valve of claim 6 wherein said outer shell includes a narrow diameter section in a central longitudinal area, said first and second pairs of ports and openings and valve sealing means being disposed symmetrically about said central area.

* * * * *